United States Patent
Shastry et al.

(10) Patent No.: US 7,778,494 B2
(45) Date of Patent: Aug. 17, 2010

(54) FIR-BASED INTERPOLATION IN ADVANCED VIDEO CODECS ON VLIW PROCESSOR

(75) Inventors: Pavan V. Shastry, Bangalore (IN);
Sunand Mittal, Uttar Pradesh (IN);
Anurag Mithalal Jain, Bangalore (IN);
Ratna M. V. Reddy, Bangalore (IN)

(73) Assignee: Texas Instruments Incorporated, Dallas, TX (US)

( * ) Notice: Subject to any disclaimer, the term of this patent is extended or adjusted under 35 U.S.C. 154(b) by 978 days.

(21) Appl. No.: 11/549,147

(22) Filed: Oct. 13, 2006

(65) Prior Publication Data

US 2007/0120867 A1    May 31, 2007

Related U.S. Application Data

(60) Provisional application No. 60/726,335, filed on Oct. 13, 2005.

(51) Int. Cl.
*G06K 9/32* (2006.01)
*G06K 9/40* (2006.01)
*G06K 9/20* (2006.01)
*H04N 5/14* (2006.01)
*H04N 9/64* (2006.01)

(52) U.S. Cl. .................. 382/300; 382/260; 382/283; 382/293; 348/699

(58) Field of Classification Search .............. 382/300
See application file for complete search history.

(56) References Cited

U.S. PATENT DOCUMENTS 7,505,636 B2 *    3/2009    MacInnis et al. ............ 382/300

OTHER PUBLICATIONS

Lei et al., "An Efficient VLSI Architecture for MC Interpolation in AVC Video Coding", International Multi Conference in Computer Science and Computer Engineering, Jun. 21-24, 2004.*
Lee et al., "H.264 Decoder Optimization Exploiting SIMD Instructions", The 2004 IEEE Asia-Pacific Conference on Circuits and Systems, vol. 2, Dec. 2004, pp. 1149-1152.*
Lie et al., "Hardware-Efficient Computing Architecture for Motion Compensation Interpolation in H.264 Video Coding", IEEE International Symposium on Circuits and Systems, vol. 3, May 23-26, 2005, pp. 2136-2139.*

\* cited by examiner

*Primary Examiner*—Bhavesh M Mehta
*Assistant Examiner*—Jose M Torres
(74) *Attorney, Agent, or Firm*—Robert D. Marshall, Jr.; W. James Brady; Frederick J. Telecky, Jr.

(57) ABSTRACT

A half sample and quarter sample pixel value interpolation calculation classifies a set of all possible half sample and quarter sample pixel value interpolation calculations into a plurality of interpolation types. A function kernel for each interpolation type includes a half sample pixel and all quarter sample pixels whose value calculation depend on a value of said half sample pixel value. The correct function kernel is called invoking the corresponding value interpolation calculation. The function kernels operate iteratively over a plurality of macroblocks of at least two macroblock sub-partition sizes. The calculation of dependent quarter sample pixel values preferably employs a packed average instruction.

4 Claims, 5 Drawing Sheets

FIR-BASED INTERPOLATION IN ADVANCED VIDEO CODECS ON VLIW PROCESSOR

CLAIM OF PRIORITY

This application claims priority under 35 U.S.C. 119(e)(1) to U.S. Provisional Application No. 60/726,335 filed Oct. 13, 2005.

TECHNICAL FIELD OF THE INVENTION

The technical field of this invention is motion estimation and compensation in video codecs.

BACKGROUND OF THE INVENTION

Motion-compensated inter-frame prediction, a well known technique in video compression, exploits temporal redundancy between adjacent frames. Motion compensation is typically performed at block level, generally a macroblock (MB) of size 16×16 pixels. Advanced video standards support a range of block sizes and fine sub-pixel motion vectors. This provides better compression performance, but increases the complexity of the encoding and decoding processes.

For instance, H.264 video compression standard also known as MPEG-4 Part 10, "Advanced Video Coding" supports a range of block sizes from 4×4 blocks to 16×16 blocks and fine sub-pixel motion vectors, such as full pel, half pel and quarter pel. This standard uses a relatively complex 6-tap Finite Impulse Response (FIR) interpolation filter for sub-pixel interpolation to achieve better compensation performance.

Sub-pixel interpolation for a macro block takes significant processor cycles in video codecs. Most of the processor cycles are consumed by multiply and accumulate (MAC) operations required by FIR filters. It is comparatively faster to implement such an operation on a digital signal processor (DSP) or by using some specific hardware (H/W) block than on a general purpose microprocessor. The Texas Instruments TMS320C6400 family digital signal processor can achieve up to 8 MACs/cycle using software-pipelined SIMD (single instruction multiple data) instructions. This DSP can sustain such a performance level only by exploiting the inherent parallelism of its very long instruction word (VLIW) architecture. However, the parallelism provided by the next generation video codecs is limited severely if the video codec uses smaller block size in implementing the standard.

SUMMARY OF THE INVENTION

This invention employs a classification based interpolation technique. This invention classifies blocks based on their respective sizes and divides interpolation types into different categories. This permits maximum parallelism on VLIW architecture through software pipelining. This invention also lies in the definition of the APIs of these interpolation functions, each of them operating on multiple blocks of different sizes belonging to the same category. This invention obtains an overall reduction of 20% to 70% processor cycles for implementation of H.264 interpolation on TMS320C6400 DSP compared to the conventional approach of functions operating on a block by block basis.

BRIEF DESCRIPTION OF THE DRAWINGS

These and other aspects of this invention are illustrated in the drawings, in which.

DETAILED DESCRIPTION OF PREFERRED EMBODIMENTS

Figure 1:
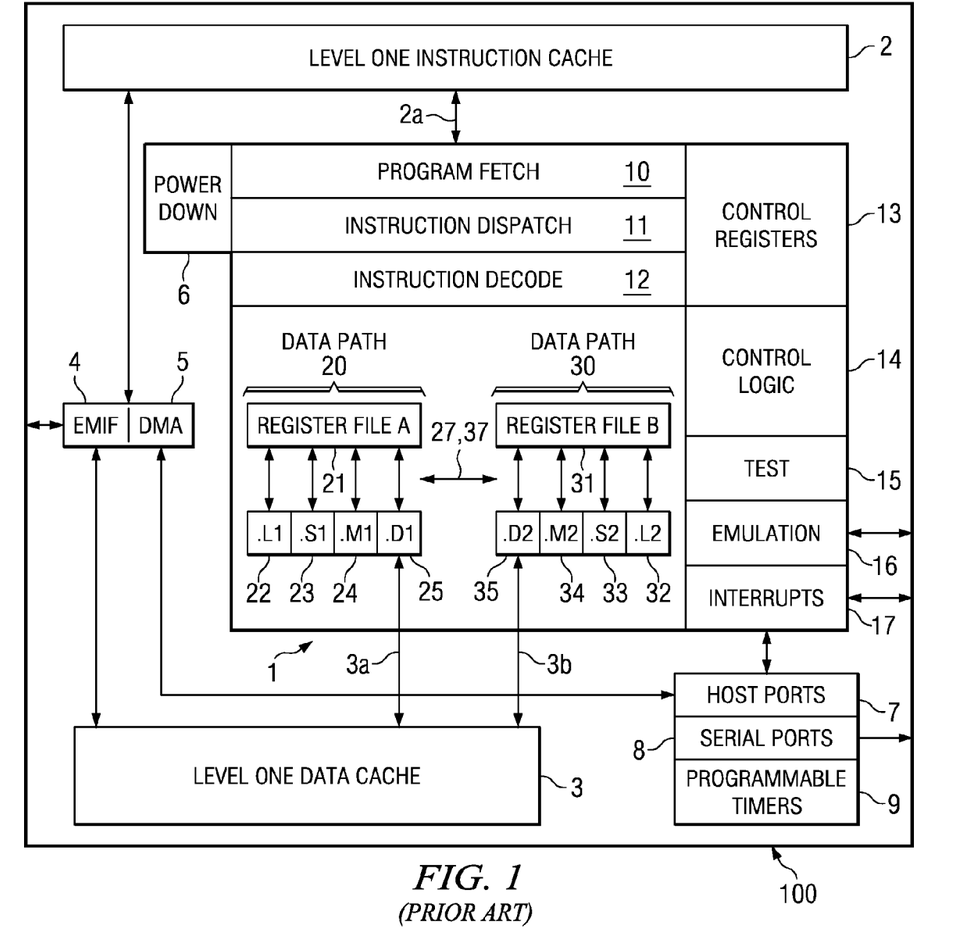
FIG. 1 illustrates details of a very long instruction word digital signal processor integrated circuit suitable for practicing this invention (prior art)

FIG. 1 is a block diagram illustrating details of a digital signal processor integrated circuit 100 suitable but not essential for use in this invention (prior art). The digital signal processor integrated circuit 100 includes central processing unit 1, which is a 32-bit eight-way VLIW pipelined processor. Central processing unit 1 is coupled to level 1 instruction cache 2 included in digital signal processor integrated circuit 100. Digital signal processor integrated circuit 100 also includes level one data cache 3. Digital signal processor integrated circuit 100 also includes peripherals 4 to 9. These peripherals preferably include an external memory interface (EMIF) 4 and a direct memory access (DMA) controller 5. External memory interface (EMIF) 4 preferably supports access to supports synchronous and asynchronous SRAM and synchronous DRAM. Direct memory access (DMA) controller 5 preferably provides 2-channel auto-boot loading direct memory access. These peripherals include power-down logic 6. Power-down logic 6 preferably can halt central processing unit activity, peripheral activity, and phase lock loop (PLL) clock synchronization activity to reduce power consumption. These peripherals also include host ports 7, serial ports 8 and programmable timers 9.

Central processing unit 1 has a 32-bit, byte addressable address space. Internal memory on the same integrated circuit is preferably organized in a data space including level one data cache 3 and a program space including level one instruction cache 2. When off-chip memory is used, preferably these two spaces are unified into a single memory space via the external memory interface (EMIF) 4.

Level one data cache 3 may be internally accessed by central processing unit 1 via two internal ports 3a and 3b. Each internal port 3a and 3b preferably has 32 bits of data and a 32-bit byte address reach. Level one instruction cache 2 may be internally accessed by central processing unit 1 via a single port 2a. Port 2a of level one instruction cache 2 preferably has an instruction-fetch width of 256 bits and a 30-bit word (four bytes) address, equivalent to a 32-bit byte address.

Central processing unit 1 includes program fetch unit 10, instruction dispatch unit 11, instruction decode unit 12 and two data paths 20 and 30. First data path 20 includes four functional units designated L1 unit 22, S1 unit 23, M1 unit 24 and D1 unit 25 and 16 32-bit A registers forming register file 21. Second data path 30 likewise includes four functional units designated L2 unit 32, S2 unit 33, M2 unit 34 and D2 unit 35 and 16 32-bit B registers forming register file 31. The functional units of each data path access the corresponding register file for their operands. There are two cross paths 27 and 37 permitting limited access to one register in the opposite register file each pipeline stage. Central processing unit 1 includes control registers 13, control logic 14, and test logic 15, emulation logic 16 and interrupt logic 17.

Program fetch unit 10, instruction dispatch unit 11 and instruction decode unit 12 recall instructions from level one instruction cache 2 and deliver up to eight 32-bit instructions to the functional units every instruction cycle. Processing occurs in each of the two data paths 20 and 30. As previously described above each data path has four corresponding functional units (L, S, M and D) and a corresponding register file containing 16 32-bit registers. Each functional unit is controlled by a 32-bit instruction. The data paths are further described below. A control register file 13 provides the means to configure and control various processor operations.

Figure 2:
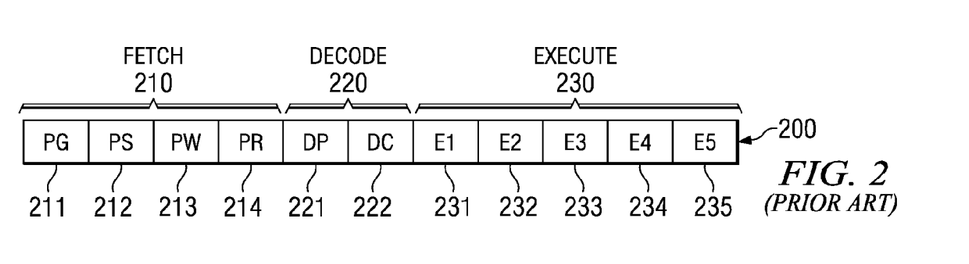
FIG. 2 illustrates the pipeline stages of the very long instruction word digital signal processor integrated circuit illustrated in FIG. 1 (prior art)

FIG. 2 illustrates the pipeline stages 200 of digital signal processor integrated circuit 100 (prior art). These pipeline stages are divided into three groups: fetch group 210; decode group 220; and execute group 230. All instructions in the instruction set flow through the fetch, decode, and execute stages of the pipeline. Fetch group 210 has four phases for all instructions, and decode group 220 has two phases for all instructions. Execute group 330 requires a varying number of phases depending on the type of instruction.

The fetch phases of the fetch group 210 are: Program address generate phase 211 (PG); Program address send phase 212 (PS); Program access ready wait stage 213 (PW); and Program fetch packet receive stage 214 (PR). Digital signal processor integrated circuit 100 uses a fetch packet (FP) of eight instructions. All eight of the instructions proceed through fetch group 210 together. During PG phase 211, the program address is generated in program fetch unit 10. During PS phase 212, this program address is sent to memory. During PW phase 213, the memory read occurs. Finally during PR phase 214, the fetch packet is received at CPU 1.

The decode phases of decode group 220 are: Instruction dispatch (DP) 221; and Instruction decode (DC) 222. During the DP phase 221, the fetch packets are split into execute packets. Execute packets consist of one or more instructions which are coded to execute in parallel. The relationship between a fetch packet and an execute packet will be explained below. During DP phase 222, the instructions in an execute packet are assigned to the appropriate functional units. Also during DC phase 222, the source registers, destination registers and associated paths are decoded for the execution of the instructions in the respective functional units.

The execute phases of the execute group 230 are: Execute 1 (E2) 231; Execute 2 (E2) 232; Execute 3 (E3) 233; Execute 4 (E4) 234; and Execute 5 (E5) 235. Different types of instructions require different numbers of these phases to complete. These phases of the pipeline play an important role in understanding the device state at CPU cycle boundaries.

During E1 phase 231, the conditions for the instructions are evaluated and operands are read for all instruction types. For load and store instructions, address generation is performed and address modifications are written to a register file. For branch instructions, branch fetch packet in PG phase 211 is affected. For all single-cycle instructions, the results are written to a register file. All single-cycle instructions complete during the E1 phase 231.

During the E2 phase 232, for load instructions, the address is sent to memory. For store instructions, the address and data are sent to memory. Single-cycle instructions that saturate results set the SAT bit in the control status register (CSR) if saturation occurs. For single cycle 16×16 multiply instructions, the results are written to a register file. For M unit non-multiply instructions, the results are written to a register file. All ordinary multiply unit instructions complete during E2 phase 222.

During E3 phase 233, data memory accesses are performed. Any multiply instruction that saturates results sets the SAT bit in the control status register (CSR) if saturation occurs. Store instructions complete during the E3 phase 233.

During E4 phase 234, for load instructions, data is brought to the CPU boundary. For multiply extensions instructions, the results are written to a register file. Multiply extension instructions complete during the E4 phase 234.

During E5 phase 235 assuming no memory stall, load instructions write data into a register. Load instructions complete during the E5 phase 235.

This invention is described through an exemplary embodiment of the H.264 standard. The fractional interpolation for luma samples in H.264 standard is described in a first section. The problems and steps involved for implementation of fractional interpolation on VLIW architecture is described in a second section. This second section also describes a simple implementation approach. The proposed solution of this invention is described in a third section.

Figure 3A:
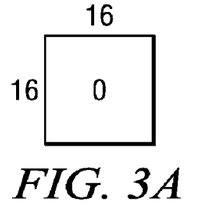
FIG. 3 illustrates four ways an example macroblock of 16×16 pixels can be sub-divided into macroblock partitions.
Figure 3B:
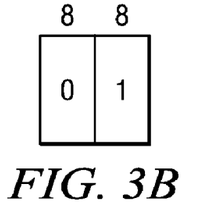
Figure 3C:
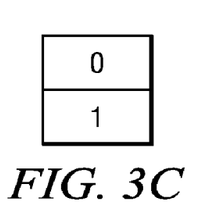
Figure 3D:
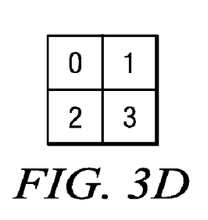
Figure 4A:
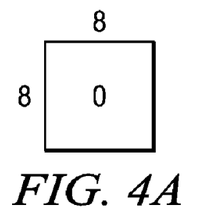
FIG. 4 illustrates four ways an example macroblock partition of 8×8 pixels can be further sub-divided into macroblock sub-partitions.
Figure 4B:
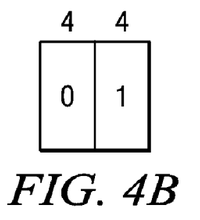
Figure 4C:
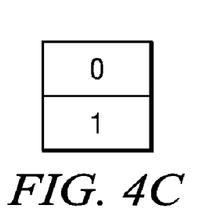
Figure 4D:
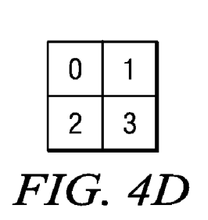

The H.264 standard supports motion compensation block sizes ranging from 16×16 pixels to 4×4 pixels for luma samples. FIG. 3 illustrates four ways the luma component can be sub-divided for a given macroblock of 16×16 pixels. These are: a single 16×16 pixel block illustrated in FIG. 3A; two 16×8 pixel blocks illustrated in FIG. 3B; two 8×16 pixel blocks illustrated in FIG. 3C; and four 8×8 pixel blocks illustrated in FIG. 3D. Each of the sub-divided regions illustrated in FIGS. 3A to 3D is called a macroblock partition. If the 8×8 pixel block mode of FIG. 3D is chosen, each of the four 8×8 macroblock partitions may be split in a further 4 ways. These are: a single 8×8 pixel block as illustrated in FIG. 4A; two 8×4 pixel blocks as illustrated in FIG. 4B; two 4×8 pixel blocks as illustrated in FIG. 4C; and four 4×4 pixel blocks as illustrated in FIG. 4D. Each of these further sub-divided regions is known as a macroblock sub-partition.

Each partition and sub-partition requires a separate motion vector for encoding. The standard supports sub-pixel motion vectors with resolution of a quarter pixel. Each partition in an inter-coded macroblock is predicted from an area of same size in a reference picture. The offset between the two areas has a quarter pixel resolution. The choice of partition and the associated motion vector is encoded by the encoder.

The samples at sub-pixel positions do not exist in the reference picture and are created by interpolation from nearby image samples. There are total of 15 sub-pixel positions. Steps to generate the sub-pixel samples are described through FIG. 5.

Figure 5:
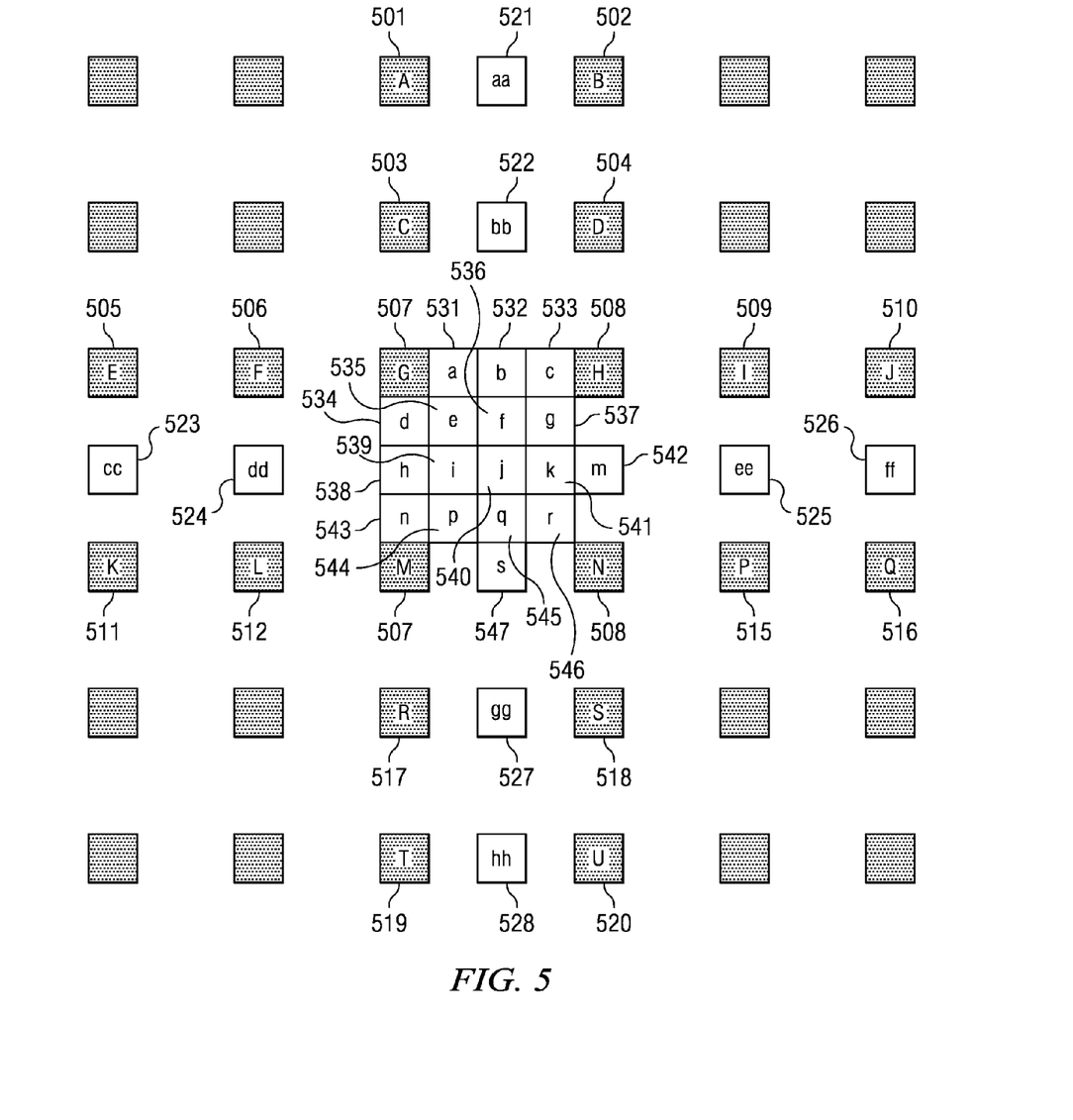
FIG. 5 illustrates the relationship between actual input pixels, interpolated half sample pixels and interpolated quarter sample pixels.

FIG. 5 illustrates a 2 dimensional array of pixels which will be used to demonstrate derivation of half pel values and quarter pel values. The pixels 501 to positions labeled with upper-case letters A to U represent full-sample points. These are the pixel inputs and have a range of values from 0 to 255. The problem of quarter pel computation receives pixels 501A to 520 U as inputs and calculates values for fractional sample positions 531 a, 532 b, 533 c, 534 d, 535 e, 536 f, 537 g, 538 h, 539 i, 540 j, 541 k, 542 m, 543 n, 544 p, 545 q, 546 r and 547 s need to be calculated. One of the sample points needs to be generated by decoder based upon the type of motion compensation required.

The prior art steps to calculate the fractional samples are as follows. The half sample points (½ interpolation) 521 aa, 522 bb, 523 cc, 524 dd, 525 ee, 526 ff, 527 gg 528 hh as well as 532 b, 538 h, 542 m and 547 s are calculated by applying a 6-tap filter with tap values 1, −5, 20, 20, −5 and 1. The quarter sample points are calculated by averaging samples at full and half sample points.

This process begins by calculation of half sample points. For example, the value of half sample pixel 532 b is calculated by first applying a 6-tap filter on input samples in the horizontal direction to get an intermediate value b1. This intermediate value b1 is then clipped to the input range 0 to 255 to generate the desired value b. This is shown mathematically as follows:

$$b_1 = (E - 5*F + 20*G + 20*H - 5*I + J) \tag{1}$$

$$b = \text{Clip1}((b_1 + 16) >> 5) \tag{2}$$

where: E is the value of input pixel 505; F is the value of input pixel 506; G is the value of input pixel 507; H is the value of input pixel 508; I is the value of input pixel 509; and J is the value of input pixel 510. The function Clip1(x) is defined as follows:

$$\text{Clip1}(x) = \begin{cases} 0 & \text{if } x < 0, \\ 255 & \text{if } x > 255, \text{ and} \\ x & \text{otherwise} \end{cases} \tag{3}$$

The function x>>y represents an arithmetic right shift of x by y bits. This corresponds to $x/2^y$.

Similarly, the value of half sample pixel 538 h is calculated by applying 6-tap filter in vertical position and clipping as follows:

$$h_1 = (A - 5*C + 20*G + 20*M - 5*R + T) \tag{4}$$

$$h = \text{Clip1}((h_1 + 16) >> 5) \tag{5}$$

where: A is the value of input pixel 501; C is the value of input pixel 503; G is the value of input pixel 507; M is the value of input pixel 507; R is the value of input pixel 517; and T is the value of input pixel 519. The values of half sample pixels 542 m and 547 s are similarly calculated.

The value of half sample pixel 540 j is calculated by first calculating an intermediate value denoted by j1 by applying the 6-tap filter to the intermediate values of closest half samples in either horizontal or vertical direction (these yield similar result) as follows:

$$j_1 = cc - 5*dd + 20*h_1 + 20*m_1 - 5*ee + ff, \text{ or} \tag{6}$$

$$j_1 = aa - 5*bb + 20*b_1 + 20*s_1 - 5*gg + hh \tag{7}$$

The values of half sample pixels 521 aa, 522 bb, 527 gg, 547 s1 and 528 hh are calculated by applying 6-tap filter horizontally and clipping in the same manner as calculation of b1 above. Similarly, the values of half sample pixels 523 cc, 524 dd, 525 ee, 542 m1 and 526 ff are calculated by vertical 6-tap filter in the same manner as calculation of h1 above. The final value of j for pixel 540 is calculated by clipping j1:

$$j = \text{Clip1}((j_1 + 512) >> 10) \tag{8}$$

The value of half sample points 547 s and 542 m are calculated by clipping s1 and m1 as follows:

$$s = \text{Clip1}((s_1 + 16) >> 5) \tag{9}$$

$$m = \text{Clip1}((m_1 + 16) >> 5) \tag{10}$$

This is similar to the calculation of values for half sample points 532 b and 538 h.

The values for quarter sample pixels 531 a, 533 c, 534 d, 543 n, 536 f, 541 k and 545 q are calculated by averaging with upward rounding the nearest input and half-sample points as follows:

$$a = (G + b + 1) >> 1 \tag{11}$$

$$c = (H + b + 1) >> 1 \tag{12}$$

$$d = (G + h + 1) >> 1 \tag{13}$$

$$n = (M + h + 1) >> 1 \tag{14}$$

$$f = (b + j + 1) >> 1 \tag{15}$$

$$i = (h + j + 1) >> 1 \tag{16}$$

$$k = (j + m + 1) >> 1 \tag{17}$$

$$q = (j + s + 1) >> 1 \tag{18}$$

The values for quarter sample pixels 535 e, 537 g, 544 p and 546 r are calculated by averaging with upward rounding of the two nearest half-sample points in diagonal direction as follows:

$$e = (b + h + 1) >> 1 \tag{19}$$

$$g = (b + m + 1) >> 1 \tag{20}$$

$$p = (h + s + 1) >> 1 \tag{21}$$

$$r = (m + s + 1) >> 1 \tag{22}$$

As described above, there are 15 types of fractional interpolation types illustrated in FIG. 5. These are 531 a, 532 b, 533 c, 534 d, 535 e, 536 f, 537 g, 538 h, 539 i, 540 j, 541 k, 543 n, 544 p, 545 q and 546 r. There are 7 types of partition for a given 16×16 macroblock of the following sizes: 16×16; 16×8; 8×16; 8×8; 8×4; 4×8; and 4×4.

This invention is an alternative algorithm that calculates the values of the fractional pixels in a manner advantageously executed on a VLIW digital signal processor. This algorithm includes a kernel invoked by control logic. The kernel will typically have a loop which runs for a set of iterations (loop_cnt) of signal processing operations on a set of pixels in each iteration. The innermost loop is software-pipelined by compiler to exploit maximum parallelization on VLIW processor. The performance of video codec on a VLIW processor is governed by feasibility and length of software pipeline in the innermost loop of the kernel. This operates best with a large value loop_cnt because: the compiler requires a minimum threshold loop_cnt to enable software-pipelining; and a large loop_cnt leads to longer software-pipeline, reducing the overhead of any required loop prolog and loop epilog.

A typical prior art interpolation kernel operates on a fixed size block. The kernel runs a loop for loop_cnt number of times, processing a set of pixels in single iteration. The loop_cnt for the kernel is defined as follows:

$$\text{loop\_cnt} = \frac{\text{pixels\_in\_block}}{\text{pixels\_processed\_per\_iteration}} \quad (23)$$

The number pixels_in_block is getting smaller due to small block sizes in advanced video coding standards. The use of SIMD instructions provides capability of processing large number of pixels per iteration. These factors lead to smaller loop_cnt and hence poor software-pipelining leading to degraded performance. As an example, H.264 has smallest block size of 4×4 (16 pixels). With SIMD operations, 16 or 8 pixels can be processed in single iteration for most of interpolations. This leads to loop_cnt of 1 or 2. So, these small values of loop_cnt lead to poor software-pipeline performance with large prolog-epilog overhead or prohibit pipelining completely.

The H.264 fractional interpolations have the following characteristics. There are similarities between some of interpolation types. There can be large number of small blocks of different sizes, each of which can have different interpolations. Thus there will be significant overhead of function call to process a given block. The software pipeline for small block sizes will be poor due to reasons mentioned above.

This invention is based upon these observations and seeks to enable efficient software pipelining. This invention includes the following features. This invention groups together a set of similar interpolations which involve similar mathematical operations to form an interpolation set called interp_set. A kernel processes all interpolation types within a given interp_set. This kernel receives an input to select one interpolation type from the interp_set. For H.264, the 15 interpolation types noted above are classified into 5 different interp_sets. This provides an optimum number of kernels with optimum code size at the cost of minimal or no cycle overhead. The required control code logic is less than a look-up table with one kernel for each of the 15 interpolation types.

This invention processes multiple blocks of fixed size in a single kernel. The iteration over a number of blocks is merged with the inner loop of iteration over a number of pixels. This is termed N-block approach. This invention treats all macroblock partitions as multiples of 8×8 and 4×4 sizes. This division of a variable sized block into multiple units of 8×8 or 4×4 blocks has following advantages. It enables software pipeline spanning multiple blocks and reduces overhead of loop prolog and loop epilog for each block if the number of blocks N is greater than 1. Thus blocks requiring interpolation from an interp_set are grouped and processed together leading to N>1. The overhead of function calls for each block is reduced because the kernel is called for N blocks. The gain in the performance is directly proportional to the number of blocks processed at a time. The grouping of this invention extends over multiple macroblocks to further increase the total number of blocks processed in a single function call.

According to this invention, the 15 interpolations types of H.264 are grouped into 5 interp_sets. Table 1 lists these 5 interp_sets.

TABLE 1

| Interp_set | Fractional samples |
| --- | --- |
| Hqphp | a, b, c |
| Vqphp | d, h, n |
| VqpHhp | f, j, q |

TABLE 1-continued

| Interp_set | Fractional samples |
| --- | --- |
| VhpHqp | i, j, k |
| VqpHqp | e, g, p, r |

In Table 1: H represents horizontal interpolation; V represents vertical interpolation; hp represents half pixel interpolation; and qp represents quarter-pixel interpolation. This classification exploits similarity in the instructions used to perform interpolation. For example, calculation of the value of quarter pixels a or c requires calculation of the value of half pixel b and an additional averaging instruction inside the kernel. The TMS320C6400 DSP includes a SIMD instruction AVGU4 which performs averaging of four bytes packed into a 32-bit word. This permits four quarter-pel interpolation pixels to be generated from the a and c results with one additional instruction. This instruction operates on a multiplier functional unit which is generally less loaded than other functional units. Thus the number of extra cycles required to perform averaging is usually zero because the AVGU4 instruction may operate in an instruction slot where the multiplier unit was previously unused. In the worst case, in which the pipelining is bounded by the multiplier unit instructions, only one extra instruction cycle would be required. Thus this quarter pixel interpolation is almost free. Hence calculation of values for a, b and c is grouped in a single interp_set.

In this invention all 7 types of H.264 macroblock partitions are treated as 8×8 and 4×4 blocks. For instance, a 16×16 partition is treated as 4 8×8 blocks. Each of an 8×16 partition and a 16×8 partition is treated as 2 8×8 blocks. This invention provides two kernels for each interp_set, one for a 8×8 block and one for a 4×4 block. Each kernel processes N blocks of the corresponding size. Thus this embodiment of the invention includes 5 Interp_set*2 block size=10 kernels. The naming convention of kernel is [Interp_set]_[blocksize] Table 2 lists these 10 kernels.

TABLE 2

| Kernel | Block Size |
| --- | --- |
| Hqphp_8 × 8 | 8 × 8 |
| Vqphp_8 × 8 | 8 × 8 |
| VqpHhp_8 × 8 | 8 × 8 |
| VhpHqp_8 × 8 | 8 × 8 |
| VqpHqp_8 × 8 | 8 × 8 |
| Hqphp_4 × 4 | 4 × 4 |
| Vqphp_4 × 4 | 4 × 4 |
| VqpHhp_4 × 4 | 4 × 4 |
| VhpHqp_4 × 4 | 4 × 4 |
| VqpHqp_4 × 4 | 4 × 4 |

This invention includes a common interface of all kernel to process multiple interpolation types. Attributes of this common interface are listed in Table 3.

TABLE 3

| Argument | Description |
| --- | --- |
| N | Number of blocks to process |
| in_ptr | Array of pointers to N input buffers |
| out_ptr | Array of pointers to N output buffers |
| interp_ptr | Array (size N) of interpolation types to select within interp_set |

This common interface specifies an array of pointers in_ptr to N buffers of input data. These pointers form a prediction block. A similar array of pointers out_ptr point directly to a reconstruction buffer. These separate pointers give additional flexibility to organize the data buffers in an appropriate manner during the overall integration of the interpolation kernels. Such separate pointers eliminate the need for and additional scratch buffer. This saves costly internal memory and unnecessary cycles spent in copying data from a scratch buffer to the reconstruction buffer. This would have otherwise been necessary but with separate pointers can be done in-place.

This invention will now be described through a representative kernel Hqphp_8×8. Listing 1 below is pseudo code for this kernel.

```
/* number of pixels in 8×8 block */
#define NUM_PIX      64
/* pixels processed in one iteration */
#define PIX_ITER     16
void Hqphp_8×8 (N, in_ptr, out_ptr, interp_ptr)
{
    /* 1) set the loop_cnt*/
    loop_cnt = N * NUM_PIX/PIX_ITER;
    out_loop = 0;
    /* software pipelined loop */
    for (i=0; i< loop_cnt;i++)
    {
        /* 2) set the pointers new block every 4th
                iteration */
        if (out_loop%PIX_ITER == 0)
        {
            in_buf    = *in_ptr++;
            out_buf   = *out_ptr++;
            interp_val = interp_ptr++;
        }
        out_loop++;
        /* 3) half interpolation processing */
        // read the input pixels from in_buf.
        // process for half interpolation (b_interp)
        // and generate the b out_pel
        /* 4) quarter interpolation processing */
        if ( interp_val == a_interp)
        {
            // take average of out_pel with input pixel G
            // to generate the pixel a in out_pel
        }
        else if (interp_val == c_interp)
        {
            // take average of out_pel with input pixel H
            // to generate the pixel c in out_pel
        }
        /* 5) write the output and increment pointers*/
        // write the out_pel to out_buf
        // increment the in_buf and out_buf pointers
    } /* end of loop */
} /* end of kernel */
```

Listing 1

The variables N, in_ptr, out_ptr, interp_ptr are input arguments as listed in Table 3. In this example kernel there are 8×8=64 pixels, thus NUM_PIX is 64. Each pixel is of 1 byte of data. Using SIMD instructions and efficient memory read/write, 16 pixels (PIX_ITER) are processed in single iteration. The Hqphp_8×8 kernel of this example generates one of 3 interpolation pixels 531 a, 532 b or 533 c shown in FIG. 5. The pixel selection depends upon interp_val, which is the interpolation value pointed by interp_ptr for a given block. In this example interp_val can take three enumerated values a_interp, b_interp, c_interp for the three interpolation types.

Section 1 initializes loop_cnt and out_loop. Listing 1 shows a single loop in kernel which runs for loop_cnt number of times. The loop count loop_cnt is N*(64/16)=4*N. In this example each block is thus processed in 4 iterations. The output counter out_loop is set to 0.

Listing 1 includes a loop indexed by loop index i from 0 to loop_cnt. Section 2 sets the input pointer in_buf, the output pointer out_buf and the interpolation type interp_val to a new block every fourth iteration. Section 2 also increments out_loop each iteration.

Section 3 in the loop performs the half pixel filtering. Every invocation of Hqphp_8×8 reads the input pixels and calculates the value of pixel b. The calculation is not shown in detail in Listing 1, it occurs as previously described. This calculated value is stored in out_pel.

Section 4 in the loop performs the quarter pixel filtering. If inter_val is a_interp, then Listing 1 calculates the value of pixel a as described above. Then this calculated value is stored in out_pel replacing the calculated value of pixel b. If inter_val is c_interp, then Listing 1 calculates the value of pixel c as described above. Then this calculated value is stored in out_pel replacing the calculated value of pixel b. These calculations are not shown in detail in Listing 1, but are fully described above. If interp_val is b_interp, then neither of these calculations are performed. The value in out_pel thus remains the value of pixel b calculated in section 3.

Section 5 of Listing 1 outputs the value in out_pel to the output buffer out_buf and increments the input buffer pointer in_buf and the output buffer pointer out_buf. Following these steps the loop repeats unless the index variable i has reached the value of loop_cnt. When this occurs, the Hqphp_8×8 kernel is complete.

This kernel of this invention differs from the prior art in a number of ways. This kernel includes a single loop for N blocks. Thus the software pipeline on VLIW processor of this process will be long depending upon N. This contrasts the short pipeline of the conventional approach. The value of N is greater than would be expected because multiple interpolation types are handled in each kernel. The example Hqphp_8×8 kernel handles three interpolation types.

The loop execution of the 10 kernels listed in Table 2 is similar. There are small differences in complexity and type of interpolation processing. Table 4 lists the interpolated pixels and an estimate of the number of CPU cycles on the TMS320C6400 DSP from an instruction simulator. The number of CPU cycles are all for 16×16 macroblocks so that all cycle numbers are for processing the same number of pixels. These number of CPU cycles also assume that all constituent blocks are of the same interpolation type.

TABLE 4

| Kernel | Interp_set | Core VLIW Cycles per macroblock |
|---|---|---|
| Hqphp_8 × 8 | a, b, c | 288 |
| Vqphp_8 × 8 | d, h, n | 256 |
| VqpHhp_8 × 8 | f, j, q | 864 |
| VhpHqp_8 × 8 | i, j, k | 864 |
| VqpHqp_8 × 8 | e, g, p, r | 512 |
| Hqphp_4 × 4 | a, b, c | 288 |
| Vqphp_4 × 4 | d, h, n | 256 |
| VqpHhp_4 × 4 | f, j, q | 864 |
| VhpHqp_4 × 4 | i, j, k | 875 |
| VqpHqp_4 × 4 | e, g, p, r | 512 |

In prior art as described above, a single kernel performs one type of interpolation for a single fixed block size. In this invention, 15 interpolation types are grouped into five classes and each kernel processes multiple blocks. The following is a comparison of these techniques.

In the prior art a kernel performs one type interpolation on single block of fixed size. The number of cycles required for N blocks of size h by w pixels is:

$$N*((Fc+P+E+Sa+di*h*w)/pixels\_per\_iteration) \quad (24)$$

where: N is the number of blocks; Fc is the number of cycles for a function call; h and w are either 8 or 4 depending on the block size; P is the number of prolog cycles of inner loop; E is the number of epilog cycles of inner loop; Pc is the number of prolog cycles of the merged loop; Ec is the number of epilog cycles of the merged loop; Sa is the number of cycles of set up code outside outer loop for operations like setting up constants and the like; ii (see equation (25) below) is the iteration interval of the loop; and di is the increase in cycles in ii due to merging of outer and inner loops.

For this invention the 15 interpolation types are grouped into five classes and each function call processes multiple blocks. The number of cycles required for N blocks of size h by w pixels is:

$$Fc+Pc+E+N*((ii+di)*h*w/pixels\_per\_iteration)+Sa \quad (25)$$

Table 5 lists the total number of cycles required for processing 10 blocks using the prior art and this invention. Table 5 shows the reduction in number of computation cycles using this invention. Savings come from savings on function call overhead, because multiple blocks are processed in one function call. Further savings come from eliminating prolog and epilog cycles due to merging of the outer and inner loops.

TABLE 5

| KERNEL | Prior Art | Invention | % improvement |
|---|---|---|---|
| Hqphp_8 × 8 | 1630 | 813 | 50.12 |
| Vqphp_8 × 8 | 1430 | 725 | 49.3 |
| VqpHqp_8 × 8 | 2110 | 1445 | 31.5 |
| VhpHqp_8 × 8 | 2760 | 2238 | 18.91 |
| VqpHhp_8 × 8 | 2760 | 2238 | 18.91 |
| Hqphp_4 × 4 | 810 | 245 | 69.75 |
| Vqphp_4 × 4 | 680 | 215 | 68.3 |
| VqpHqp_4 × 4 | 1150 | 425 | 63.0 |
| VhpHqp_4 × 4 | 1260 | 618 | 50.95 |
| VqpHhp_4 × 4 | 1260 | 618 | 50.95 |

Figure 6:
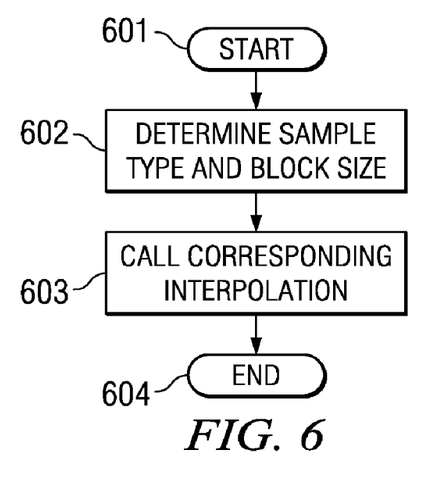
FIG. 6 is a flow chart of the basic method of this invention.

FIG. 6 is a flow chart of the basic method of this invention. This method begins at start block 601. Block 602 determines the sample type (half pel or quarter pel) to be calculated and the block size (4×4 or 8×8 in the examples above.) Block 603 calls the corresponding interpolation routine. In this invention, the 15 type interpolations for two block sizes are grouped into the 10 interpolation kernels listed in Table 4. In each case the interpolation kernel includes a half pel calculation and the corresponding dependent quarter pel calculations. For example, in Listing 1 of kernel Hqphp_8×8 the half pel calculation is for pixel 532 b and the corresponding dependent quarter pel calculations are for pixels 531 a and 533 c. This function call completes the method which ends as end block 604.

Figure 7:
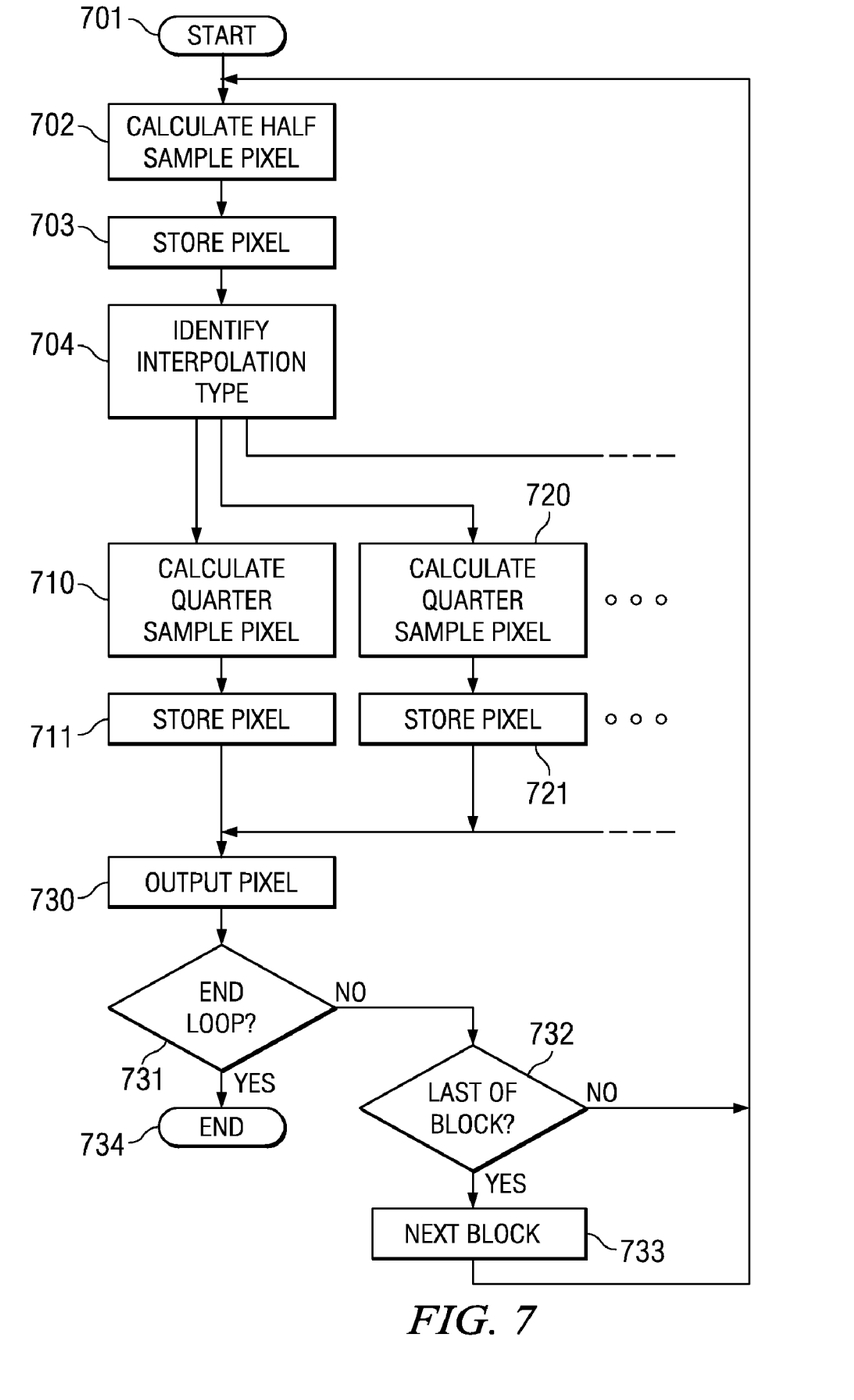
FIG. 7 illustrates a flow chart of the interpolation kernels of this invention.

FIG. 7 illustrates a flow chart of the interpolation kernels of this invention. In this example, each of the 10 kernels is structured similarly, differing mainly in the data used in the computations. The function begins with start block 701 which includes initialization of loop variables such as section 1 of Listing 1. The function then performs the half sample pixel calculation in block 702. This corresponds to section 3 in Listing 1. Depending on the particular function, this calculation uses equations (1) to (10). This calculated half sample pixel value is stored in block 703. This corresponds to the out_pel variable in Listing 1.

The function next determines the interpolation type to be performed in block 704. This function was controlled by the interp_val variable in Listing 1. Flow is dispatched to different paths depending on the result of this determination. For a first interpolation type flow proceeds to block 710 which calculates the value of the corresponding quarter sample pixel. Depending on the particular interpolation type this calculation uses one of equations (11) to (22).

Figure 8:
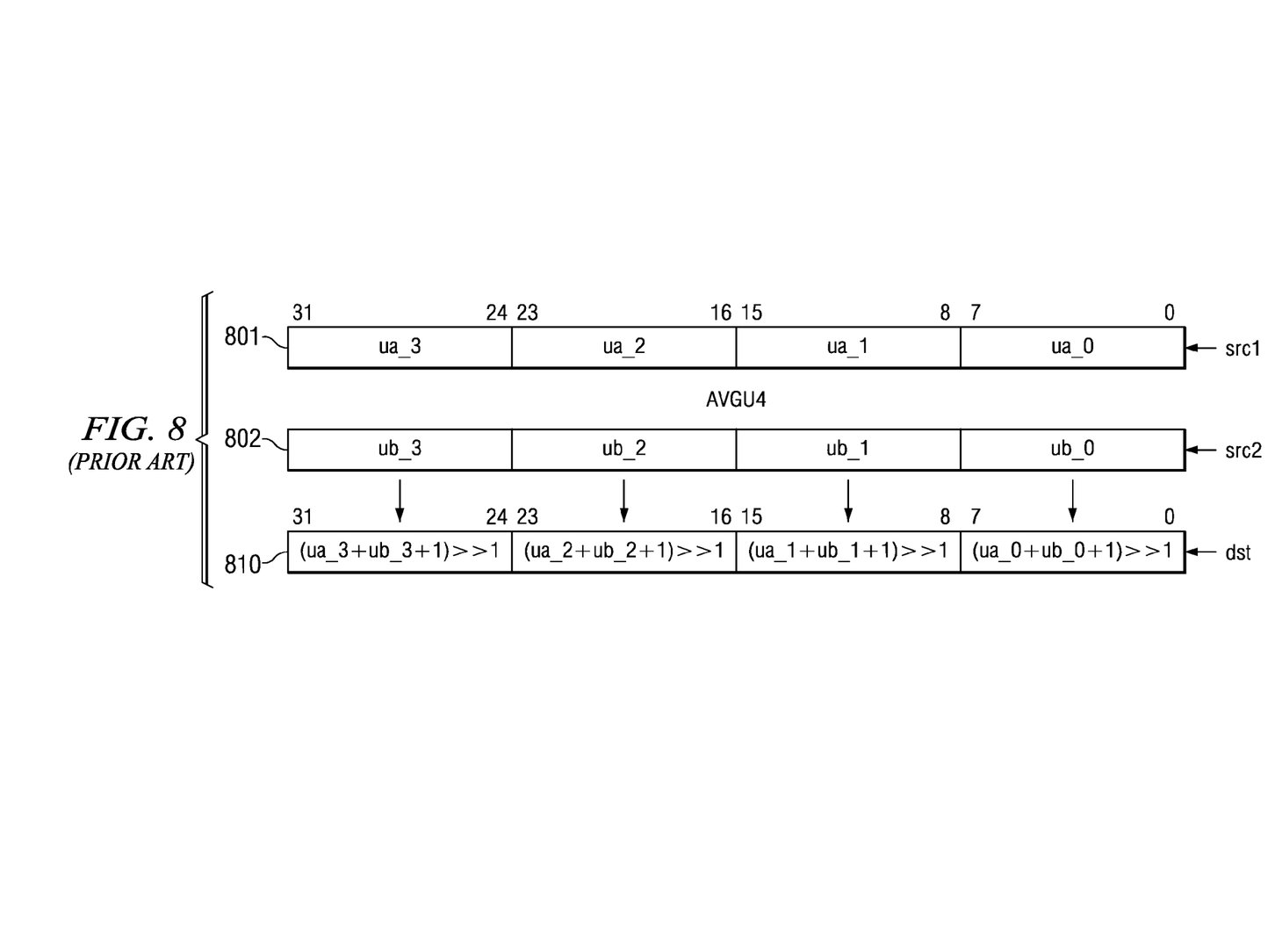
FIG. 8 illustrates the operation of a four block unsigned average instruction used in calculation of the quarter sample pixel interpolation values in this invention (prior art).

As previously mentioned, this calculation preferably employs a prior art special purpose single instruction multiple data (SIMD) instruction of central processing unit 1 illustrated in FIG. 1. FIG. 8 illustrates the operation of this four block unsigned average instruction designated AVGU4. The AVGU4 instruction performs an averaging operation on packed 8-bit data. One of multiply units 24 or 34 performs the AVGU4 instruction. The instruction specifies two source registers scr1 801 and scr2 802 and a single destination register dst 810. For multiply unit 24 these registers are in register file A 21. For multiply unit 34 these registers are in register file B 31. The values in src1 801 and src2 802 are treated as unsigned, packed 8-bit data as shown in FIG. 8. Register src1 801 is divided into four sections holding values ua_0, ua_1, ua_2 and ua_3. Register src1 802 is divided into four sections holding values ub_0, ub_1, ub_2 and ub_3. Central processing unit 1 preferably operates on 32-bit data, thus each section is 8 bits. The AVGU4 instruction performs the rounded average operation (ua_x+ub_x+1)>>1 on the values of corresponding sections of src1 801 and src2 802 and stores the result in a corresponding section of destination register dst 810. The AVGU4 instruction is an ordinary multiply unit instruction that completes during E2 phase 222. Note that each such operation corresponds to equations (11) to (22). Thus this AVGU4 instruction permits calculation of four quarter sample pixel values in parallel. Using packed data and SIMD instructions permits greater parallelism that otherwise possible.

Note that each half sample pixel calculation is independent of all other half sample pixel calculations and that each quarter sample pixel calculation is independent of all other quarter sample pixel calculation. This is because the interpolation values depend solely on the actual pixel values which are unchanged. Thus each iteration of the inner loop can calculate plural pixels. The number of pixels calculated per inner loop iteration is preferably an integral multiple of the number of packed data sections in the SIMD instruction used for quarter sample pixel interpolation.

In block 711 this newly calculated quarter sample pixel value is stored. In the example of Listing 1, this storing in section 4 replaces the previous half sample pixel value from block 703.

Blocks 720 and 721 represent calculation of alternate dependent quarter sample pixel values in the same manner as blocks 710 and 711. In this example, there could be two or three such dependent quarter sample pixel calculations. Table 4 shows that kernels Vqphp_8×8, Hqphp_8×8, VqpHhp_8×8, VhpHqp_8×8, Vqphp_4×4, Hqphp_4×4, VqpHhp_4×4 and VhpHqp_4×4 have two dependent quarter sample pixels each. Table 4 shows that kernels VqpHqp_8×8 and VqpHqp_4×4 have three dependent quarter sample pixels each.

A final path from block 704 bypasses any quarter sample pixel value calculation. This is shown in FIG. 7. This path passes directly to block 730. Note that the value of out_pel stored in block 703 is unchanged.

Block 730 outputs the calculated pixel value to an output buffer or memory location. The current value of out_pel could be that stored in blocks 703, 711 or 721 depending on the interpolation type being performed.

Test block 731 determines if this iteration is the end of the loop. If not (No at test block 731), then test block 732 determines if this in the end of a macroblock sub-partition. If so (Yes at test block 732), then block 733 sets pointers to a next macroblock sub-partition. In either case flow proceeds from test block 732 to block 702 for another iteration. If this is the end of the loop (Yes at test block 731), then the function is complete and exits at end block 734.

This pattern is followed exactly for the kernels Hqphp_8×8, Hqphp_4×4, Vqphp_8×8 and Vqphp_4×4. Slight variances are required for other kernels. Kernels VqpHhp_8×8 and VqpHhp_4×4 initially calculate the value of half sample pixel 540 j according to equations (6) or (7) and (8) and store it in out_pel (blocks 702 and 703). If interp_val indicates calculation of quarter sample pixel 536 f, then block 710 calculates half sample pixel 532 b and calculates pixel 536 f according to equation (15). If interp_val indicates calculation of quarter sample pixel 545 q, then block 720 calculates half sample pixel 547 s and calculates pixel 545 q according to equation (18). Kernels VhpHqp_8×8 and VhpHqp_4×4 initially calculate the value of half sample pixel 540 j according to equations (6) or (7) and (8) and store it in out_pel (blocks 702 and 703). If interp_val indicates calculation of quarter sample pixel 539 i, then block 710 calculates half sample pixel 538 h and calculates pixel 539 i according to equation (16). If interp_val indicates calculation of quarter sample pixel 541 k, then block 720 calculates half sample pixel 542 m and calculates pixel 545 q according to equation (17).

A different variation is used for kernels VqpHqp_8×8 and VqpHqp_4×4. Blocks 702 and 703 are omitted. If interp_val indicates calculation of quarter sample pixel 535 e, then block 710 calculates half sample pixels 532 b according to equations (1) and (2) and 538 h according to equations (4) and (5) and calculates pixel 535 e according to equation (19). If interp_val indicates calculation of quarter sample pixel 537 g, then block 720 calculates half sample pixels 532 b according to equations (1) and (2) and 542 m as outlined above and calculates pixel 537 g according to equation (20). If interp_val indicates calculation of quarter sample pixel 544 p, then an additional block not illustrated in FIG. 7 calculates half sample pixels 538 h according to equations (4) and (5) and 547 s as outlined above and calculates pixel 544 p according to equation (21). If interp_val indicates calculation of quarter sample pixel 546 r, then a further additional block not illustrated in FIG. 7 calculates half sample pixels 542 m and 547 s as outlined above and calculates pixel 546 r according to equation (22). These variations are outlined in Table 6.

TABLE 6

| Kernel | Half Sample Pixel | Dependent Quarter Sample Pixel |
| --- | --- | --- |
| Hqphp_8 × 8 | b | a, c |
| Vqphp_8 × 8 | h | d, n |
| VqpHhp_8 × 8 | j, b | f |
|  | j, s | q |
| VhpHqp_8 × 8 | j, h | i |
|  | j, m | k |
| VqpHqp_8 × 8 | b, h | e |
|  | b, m | q |
|  | h, s | p |
|  | m, s | r |
| Hqphp_4 × 4 | b | a, c |
| Vqphp_4 × 4 | h | d, n |
| VqpHhp_4 × 4 | j, b | f |
|  | j, s | q |
| VhpHqp_4 × 4 | j, h | i |
|  | j, m | k |
| VqpHqp_4 × 4 | b, h | e |
|  | b, m | g |
|  | h, s | p |
|  | m, s | r |

This invention is a method of FIR based interpolation for VLIW processors. This invention addresses the complexity of variable block sizes and plural interpolation types. The small sized blocks and different interpolation modes present in advanced video coding standards like H.264, form a major challenge for efficient software pipelining on VLIW-SIMD processors. This invention employs classification of interpolation types and processes multiple blocks per kernel. This results in maximum parallelization on VLIW processor through efficient software pipeline. Comparative results show implementing interpolation on a Texas Instruments TMS320C6400 DSP reduces processor cycles by 50 to 70% for smaller block size. For relatively larger block sizes, the savings is 20 to 50%. This application describes an example of H.264 video coding standard, but is applicable to FIR based interpolation on various video coding standards and algorithms.

What is claimed is:

1. A method of half sample and quarter sample pixel value interpolation calculation comprising the steps of:

classifying a set of all possible half sample and quarter sample pixel value interpolation calculations into a plurality of interpolation types, each interpolation type including a half sample pixel and all quarter sample pixels whose value calculation depend on a value of said half sample pixel value;

providing a function kernel for each interpolation type selectively performing one value interpolation calculation selected from the set of said half sample pixel value interpolation calculation and said dependent quarter sample pixel value interpolation calculations;

upon determining to perform a half sample or quarter sample pixel value interpolation calculation determining a corresponding interpolation type, calling said function kernel corresponding to said determined interpolation type invoking a corresponding value interpolation calculation.

2. The method of claim 1, wherein:

each of said function kernels operates iteratively over a plurality of macroblocks.

3. The method of claim 1, wherein:

said step of classifying into a plurality of interpolation types includes classifying according to at least two macroblock sub-partitions; and said step of providing a function kernel for each interpolation type provides a function kernel for each interpolation for each of said at least two macroblock sub-partitions.

4. The method of claim 1, wherein:

said step of providing a function kernel for each interpolation type provides each function kernel including instructions to calculate said dependent quarter sample pixel values employing a packed average instruction which calculates the average of corresponding sections of two source registers and store a result in a corresponding section of a destination register.

* * * * *